(No Model.)
G. P. HARMON.
WATER GAGE.
No. 289,255. Patented Nov. 27, 1883.
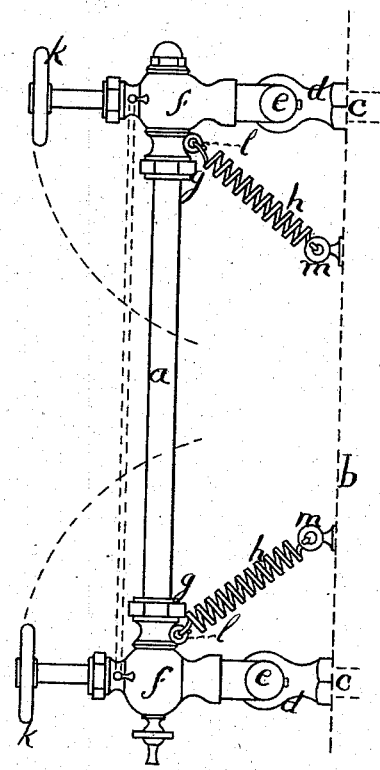
FIG. 1.
 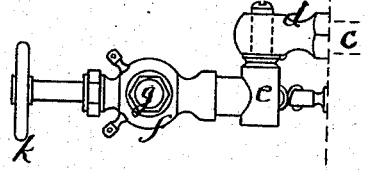 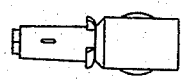
FIG. 3.     FIG. 2.     FIG. 4.
WITNESSES.
John P. Kerrigan,
Robert A. Davis.
INVENTOR.
Gilbert P. Harmon
Per Atty;
William Henry Clifford

UNITED STATES PATENT OFFICE.

GILBERT P. HARMON, OF PORTLAND, MAINE.

WATER-GAGE.

SPECIFICATION forming part of Letters Patent No. 289,255, dated November 27, 1883.

Application filed April 24, 1883. (No model.)

*To all whom it may concern:*

Be it known that I, GILBERT P. HARMON, of Portland, in the county of Cumberland and State of Maine, have invented certain new and useful Improvements in Boiler-Gages; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side elevation. Fig. 2 is a top view. Fig. 3 is a detail end view. Fig. 4 is a detail under side, showing slot.

Same letters show like parts.

My invention relates to steam-boiler gages.

It consists in the combination of a glass tube, as common, with two cocks and springs arranged and operating so as to cut off the flow of steam and water from the boiler when the glass breaks.

$a$ shows the glass tube. $b$ is the end or side of the boiler. $c$ are passages leading into the boiler, into which are set the pipes $d$. Into the outer ends of these pipes are set the horizontally-placed cocks $e$, which, when the tube-holders $f$ are upright or in a line with the pipes $d$, have ways opening into the passages of the pipes $d$, and so into the boiler. The holders $f$ also have passages which lead up to the ends of the glass tube $a$.

The particular object of my invention is to prevent escape from the boiler when the glass tube $a$, by accident or otherwise, becomes broken. It is well known that the glass of these gages is subject to frequent fracture, and then, in consequence of the heated condition of the contents of the boiler, immediate repair is impossible, because, steam and water escaping, the boiler must be cooled down before work upon the gage can be performed. Loss of time and fuel is thereby occasioned. My invention obviates this difficulty and delay. With this view I attach the holders $f$ to the cocks $e$, so that when the holders are thrown or drawn forward, as shown by the dotted lines in Fig. 1, they turn the cocks $e$ so as to close them or throw them out of communication with the passages $c$, and so prevent any water or steam of the boiler from passing through them.

$g$ are the sockets to receive the ends of the glass tube. When the glass tube is in its position in the holders $f$ and is unbroken, the holders are in position, as seen in Fig. 1, and the communications through the cocks $e$ and passages $c$ are open. If the glass breaks from any cause, the springs $h$ draw the holders $f$ downwardly or inwardly toward the surface of the boiler, and so cut off the communication with the boiler and prevent the escape, which would otherwise take place of the contents of the boiler. The stop-cocks $k$ are then employed to close the passages through the holders $f$ and up into the sockets $g$, when the holders $f$ can be put back into position and a new glass supplied. The springs $h$ are attached to the holders $f$ at $l$, and to the face of the boiler at $m$.

I do not limit myself to this precise form or arrangement of spring. Any automatic arrangement by which a spring is made to tip the holders $f$, so as to close the passages into the boiler will be sufficient and operative. Thus, in case of accident to the gage, the passages to the boiler are closed, and emission of steam and water prevented, so that the glass can be replaced without checking or reducing the heat on the boiler.

What I claim as my invention, and desire to secure by Letters Patent of the United States, is—

The combination of the cocks $e$, pipes $d$, and passages $c$ with the holder $f$, glass tube $a$, springs $h$, and cocks $k$, as herein set forth.

In testimony that I claim the foregoing as my own I affix my signature in presence of two witnesses.

GILBERT P. HARMON.

Witnesses:
WILLIAM HENRY CLIFFORD,
JOHN P. KERRIGAN.